United States Patent Office 3,240,735
Patented Mar. 15, 1966

3,240,735
THERMOPLASTIC POLYESTERS OF BISPHENOLS AND DICARBOXYLIC ACIDS HAVING INCREASED MODULUS OF ELASTICITY DUE TO PRESENCE OF STIFFNESS IMPROVING ADDITIVES
John R. Caldwell and Russell Gilkey, Kingsport, Tenn., assignors to Eastman Kodak Company, Rochester, N.Y., a corporation of New Jersey
No Drawing. Filed Sept. 14, 1961, Ser. No. 137,968
19 Claims. (Cl. 260—26)

This invention relates to additives for increasing the elastic modulus of films made from polyesters. More particularly the invention relates to such additives for thermoplastic polyesters made from bisphenols and dicarboxylic acids.

An object of the invention is to provide mixtures of bisphenol polyesters and additives for improving the elastic modulus of films made from the polyester-additive mixtures. Another object of the invention is to provide a group of additives for improving stiffness of films made from thermoplastic linear polyesters from bisphenols and dicarboxylic acids.

According to the invention, a homogeneous mixture is prepared consisting of from 60 to 90 weight percent, preferably between 70 and 85%, of a thermoplastic bisphenol-dicarboxylic acid polyester and from 10 to 40%, preferably between 15 and 30%, of one of the additives of the invention. A film is made from the mixture by extrusion or by solvent casting. The additives which are found to improve stiffness of bisphenol polyesters are:

(1) Polystyrene glycol,
(2) Polystyrene thioglycol,
(3) Chlorinated aromatic polynuclear hydrocarbons containing from 30 to 75% nuclear chlorine,
(4) Aliphatic and cycloaliphatic diol diabietates from both saturated and hydrogenated abietic acids,
(5) Monoalkyl phenols having an alkyl group containing 4–12 carbon atoms.

Polyesters of bisphenols and dicarboxylic acids possess unique properties that make them particularly useful for photographic film backing and for other similar purposes. A number of polyesters from bisphenols are described in the literature, and certain bisphenol polyesters are described in the Caldwell et al. copending application Serial No. 137,980 entitled, Bisphenol Polyesters, filed of even date herewith, now abandoned in favor of continuation-in-part Serial No. 292,139, filed July 1, 1963.

In many applications of films high modulus of elasticity is required. This is particularly true for photographic film base. The additives of the invention make it possible to improve the stiffness of films made from polyester-additive mixtures over films made from the same polyesters without additives.

Polystyrene glycol is the commercial name for the diol of poly(phenylethylene oxide):

HO—(CHCH$_2$O)$_x$—H

Polystyrene glycols having molecular weights from 378–3000 ($x$=3–25) are suitable as additives for improving elasticity of films according to the invention.

Polystyrene thioglycol is a polymer from phenylethylene sulfide. It has the structure HS—(CHCH$_2$S)$_x$—H
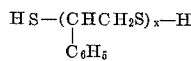

Thioglycols suitable for the invention range in molecular weight from 440–3400 ($x$=3–25).

Chlorinated aromatic polynuclear hydrocarbons containing 30–75% nuclear chlorine are suitable as additives to improve stiffness of bisphenol polyester films. Types of aromatic polynuclear hydrocarbons which may be chlorinated for this purpose are diphenyl, the terphenyls (o, m, and p), naphthalene, phenanthrene, and anthracene. Also, chlorinated aromatic compounds with the following structures are effective:

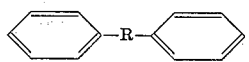

wherein R represents

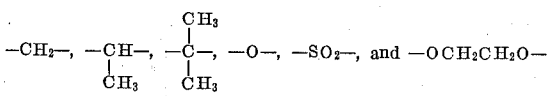

Chlorinated diphenyls containing from 30 to 75% chlorine are sold under the trade name Aroclor.

Additional additives for improving stiffness of bisphenol polyester films are di-abietates of aliphatic and cycloaliphatic diols containing from 2–20 carbon atoms. The aliphatic diols may be straight or branched. Aromatic or alicyclic groups may be present. Examples of some of these diols from which suitable diabietates are made are 1,4-butanediol; 1,10-decanediol; 2,2-dimethyl propanediol; 2,2,4 - trimethyl - 1,3 - pentanediol; 1,4 - cyclohexanedimethanol; 1,4 - alpha,alpha - xylylenediol; 1,4-cyclohexanediol; 2,5-norcamphanediol; also, ether linkages may be present, as represented in idethylene glycol, and tetraethylene glycol. Also polyhydroxy compounds containing from 3 to 15 carbon atoms can be used, such as glycerol or pentaerythritol. Diabietates may be prepared from abietic acid or from hydrogenated abietic acid. Technical grades of abietic acid and rosin acids can be employed in preparing the glycol esters.

Alkylphenols having the following structure

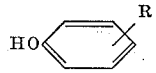

where R equals straight or branched chain alkyl groups containing 4–12 carbon atoms, are suitable additives. Of special interest are the commercially available octyl, nonyl and dodecyl phenols.

Any one of the additives mentioned above may be added to the polyester before preparing films. After addition of the additive to the bisphenol polyester, the additive content should be 10–40%. The preferred amount is between 15 and 30%. The modules of polyester films increases as the amount of the additive increases, and the heat distortion temperature decreases.

The polyester films may be extruded or they may be cast from various solvents, such as methylene chloride, chloroform, ethylene dichloride, and in certain cases, toluene. The alkyl phenol may be mixed with the polyester before the dope is prepared in one of these solvents or the additive may be added to the dope containing the polyester. After the mixture becomes homogeneous, the films are cast in the usual manner.

To illustrate the invention a number of bisphenol-dicarboxylic acid polyesters were prepared by polymerization methods described in said copending application mentioned above. The polyesters were then mixed with various of the additives listed above and an organic solvent (methylene chloride) was used to prepare dopes from which films were cast. Films were similarly prepared from the polyesters without additives. Modulus of elasticity (Young's modulus, E) of the films with and without additives were measured and are compared in the tables below.

In Table I the bisphenol polyesters are listed according to the particular bisphenol from which each was made.

TABLE I.—BISPHENOL-DICARBOXLIC ACID ESTERS

Polyesters were prepared from the following acid and bisphenol components by conventional methods:

| No. | Acid | Bisphenol |
|---|---|---|
| 1 | Terephthalic | 4,4'-(hexahydro 4,7-methano-indan-5-ylidene) diphenol. |
| 2 | Isophthalic | 4,4'-(hexahydro 4,7-methano-indan-5-ylidene) diphenol. |
| 3 | 50% terephthalic—50% trans-cyclohexane-1,4-dicarboxylic. | 4,4'-(2-norcamphanylidene) diphenol. |
| 4 | 70% trans-cyclohexane-1,4-dicarboxylic—30% terephthalic. | Bisphenol A, i.e. 4,4'-(isopropylidene) diphenol. |
| 5 | Terephthalic | 4,4'-(-3 methyl-2 norcamphanylmethylene) diphenol. |
| 6 | Trans-cyclohexane-1,4-dicarboxylic. | 4,4'-isobutylidene-diphenol. |
| 7 | do | 4,4'-cyclohexylidene diphenol. |

Table II lists the various mixtures of polyester and additive used in making the film. Polyesters listed in Table I were used and are identified in column I of Table II by reference to the corresponding number in column I of Table I. In column II the additive is identified. In column III the weight percent of additive in the polymer-additive mixture is shown. In column IV the modulus of elasticity (Young's modulus) of a film of the polyester without additive is shown and in column V the modulus of elasticity (pounds per square inch) of a film of the polyester-additive mixture is shown.

ticity of a film of said composition is increased by at least $1 \times 10^5$ pounds per square inch, said polymer being a linear polyester of at least one bifunctional dicarboxylic acid and at least one bifunctional disphenol and said additive being a member selected from the group consisting of:

Polystyrene glycols having molecular weights from 378 to 3000,

Polystyrene thioglycols having molecular weights from 440 to 3400,

Chlorinated aromatic polynuclear hydrocarbons containing from 30 to 75% nuclear chlorine, Diabietates of aliphatic and cycloaliphatic diols containing from 2–20 carbon atoms, and Alkyl phenols having the general formula

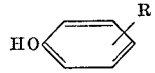

wherein R is an alkyl radical containing from 4–12 carbon atoms.

2. A thermoplastic film composed of the composition of claim 1.

3. A film-forming composition as defined by claim 1 wherein said dicarboxylic acid is terephthalic acid.

4. A film-forming composition as defined by claim 3 wherein said bisphenol is 4,4'-(hexahydro-4,7-methano-indan-5-ylidene) diphenol.

TABLE II

| I Polyester | II Additive | III Weight Percent Additive | IV Modulus Without Additive ×10⁻⁵ | V Modulus With Additive ×10⁻⁵ |
|---|---|---|---|---|
| 1 | Chlorinated diphenyl (54% Cl) | 20 | 2.8 | 5.5 |
| 2 | Chlorinated o-terphenyl (48% Cl) | 15 | 2.9 | 4.7 |
| 3 | Chlorinated diphenylmethane (58% Cl) | 15 | 2.9 | 4.5 |
| 4 | Chlorinated naphthalene (52% Cl) | 20 | 2.5 | 5.2 |
| 5 | Chlorinated diphenyl ether (46% Cl) | 20 | 3.0 | 5.7 |
| 6 | Chlorinated anthracene (56% Cl) | 15 | 2.0 | 3.9 |
| 7 | Chlorinated diphenyl (60% Cl) | 20 | 2.6 | 4.8 |
| | Diester of hydrogenated abietic acid and: | | | |
| 1 | Triethylene glycol | 20 | 2.8 | 4.3 |
| 4 | 1,4-cyclohexanedimethanol | 15 | 2.5 | 4.5 |
| 5 | 2,2-dimethyl 1,3-propanediol | 20 | 3.0 | 5.1 |
| 6 | Triethylene glycol | 25 | 2.0 | 3.7 |
| | Diester of unsaturated abietic acid and: | | | |
| 2 | Diethylene glycol | 20 | 2.9 | 4.2 |
| 3 | 1,6-hexanediol | 20 | 2.9 | 4.4 |
| 7 | 2,2,4-trimethyl-1,3-pentanediol | 15 | 2.6 | 4.3 |
| 1 | Polystyrene glycol (mol. wt. 750) | 20 | 2.8 | 4.3 |
| 2 | do | 20 | 2.9 | 4.4 |
| 3 | Polystyrene glycol (mol. wt. 500) | 20 | 2.9 | 4.1 |
| 4 | Polystyrene glycol (mol. wt. 1,000) | 15 | 2.5 | 4.5 |
| 5 | Polystyrene glycol (mol. wt. 2,000) | 15 | 3.0 | 4.9 |
| 6 | Polystyrene glycol (mol. wt. 500) | 30 | 2.0 | 3.5 |
| 7 | Polystyrene glycol (mol. wt. 750) | 20 | 2.6 | 4.0 |
| 1 | Polystyrene thioglycol (mol. wt. 700) | 20 | 2.8 | 4.1 |
| 2 | Polystyrene thioglycol (mol. wt. 700) | 20 | 2.9 | 4.3 |
| 3 | Polystyrene thioglycol (mol. wt. 1,200) | 20 | 2.9 | 4.2 |
| 4 | Polystyrene thioglycol (mol. wt. 1,200) | 15 | 2.5 | 4.5 |
| 5 | Polystyrene thioglycol (mol. wt. 2,200) | 15 | 3.0 | 4.7 |
| 6 | Polystyrene thioglycol (mol. wt. 440) | 30 | 2.0 | 3.3 |
| 7 | Polystyrene thioglycol (mol. wt. 700) | 20 | 2.6 | 4.2 |
| 1 | Nonylphenol | 20 | 2.8 | 4.1 |
| 2 | Octylphenol | 20 | 2.9 | 4.2 |
| 3 | Dodecylphenol | 15 | 2.9 | 4.0 |
| 4 | Butylphenol | 15 | 2.5 | 4.3 |
| 5 | Nonylphenol | 25 | 3.0 | 4.6 |
| 6 | Dodecylphenol | 20 | 2.0 | 3.6 |
| 7 | Nonylphenol | 15 | 2.6 | 4.0 |

The above examples are given as specific embodiments to illustrate the invention and are not to be construed to limit the scope of the invention as defined in the following claims.

We claim:

1. A film-forming composition consisting essentially of from 90 to 60 weight percent of a thermoplastic polymer and from 10 to 40 weight percent of a stiffness improving additive whereby the Young's modulus of elas- 5. A film-forming composition as defined by claim 4 wherein said additive is a chlorinated diphenyl containing about 54% chlorine.

6. A film-forming composition as defined by claim 3 wherein said bisphenol is 4,4'-(2-norcamphanylidene) diphenol.

7. A film-forming composition as defined by claim 6 wherein said additive is the 2,2-dimethyl-1,3-propanediol diester of hydrogenated abietic acid, 8. A film-forming composition as defined by claim 6 wherein said additive is a chlorinated diphenyl containing about 54% chlorine.

9. A film-forming composition as defined by claim 1 wherein said polymer is composed of isophthalic acid and 4,4'-(hexahydro 4,7-methanoindan-5-ylidene) diphenol.

10. A film-forming composition as defined by claim 1 wherein said polymer is composed of 50% terephthalic acid, 50% trans-cyclohexane-1,4-dicarboxylic acid, and 4,4'-(2-norcamphanylidene) diphenol.

11. A film-forming composition as defined by claim 1 wherein said polymer is composed of 70% trans-cyclohexane-1,4-dicarboxylic acid, 30% terephthalic acid, and 4,4'-(isopropylidene) diphenol.

12. A film-forming composition as defined by claim 1 wherein said polymer is composed of terephthalic acid and 4,4'-(3-methyl-2-norcamphanylmethylene) diphenol.

13. A film-forming compositon as defined by claim 1 wherein said polymer is composed of trans-cyclohexane-1,4-dicarboxylic acid and 4,4'-isobutylidene-diphenol.

14. A film-forming composition as defined by claim 1 wherein said polymer is composed of trans-cyclohexane-1,4-dicarboxylic acid and 4,4'-cyclohexylidene diphenol.

15. A film-forming composition as defined by claim 1 wherein said additive is a chlorinated aromatic polynuclear hydrocarbon containing from 30% to 75% nuclear chlorine.

16. A film-forming composition as defined by claim 1 wherein said additive is a polystyrene glycol having a molecular weight of from 378 to 300.

17. A film-forming composition as defined by claim 1 wherein said additive is a polystyrene thioglycol having a molecular weight of from 440 to 3400.

18. A film-forming composition as defined by claim 1 wherein said additive is a diabietate of a diol as defined by claim 1.

19. A film-forming composition as defined by claim 1 wherein said additive is an alkyl phenol as defined by claim 1.

References Cited by the Examiner
UNITED STATES PATENTS

| | | | |
|---|---|---|---|
| 1,987,228 | 1/1935 | Bruson | 260—33.4 |
| 2,590,910 | 4/1952 | Wittcoff et al. | 260—26 |
| 2,734,879 | 2/1956 | Lyons | 260—26 |
| 2,856,379 | 10/1958 | Carnall et al. | 260—33.8 |
| 2,968,639 | 1/1961 | Caldwell et al. | 260—33.8 |
| 3,065,204 | 11/1962 | Dietrich et al. | 260—47 |

FOREIGN PATENTS

| | | |
|---|---|---|
| 1,111,389 | 7/1961 | Germany. |

OTHER REFERENCES

Ind. Eng. Chem., vol. 51, No. 2, February 1959, pages 147–150 (copy in Scientific Library).

LEON J. BERCOVITZ, *Primary Examiner.*

M. STERMAN, *Examiner.*